US012700764B2

(12) United States Patent
Lu et al.

(10) Patent No.: US 12,700,764 B2
(45) Date of Patent: Aug. 4, 2026

(54) MOTOR ROTOR

(71) Applicants:Weidong Lu, Los Altos, CA (US);
Daisy Kwok, Los Altos, CA (US)

(72) Inventors: Weidong Lu, Los Altos, CA (US);
Daisy Kwok, Los Altos, CA (US)

( * ) Notice: Subject to any disclaimer, the term of this
patent is extended or adjusted under 35
U.S.C. 154(b) by 261 days.

(21) Appl. No.: 18/334,881

(22) Filed: Jun. 14, 2023

(65) Prior Publication Data

US 2024/0421644 A1      Dec. 19, 2024

(51) Int. Cl.
| | |
|---|---|
| H02K 1/32 | (2006.01) |
| H02K 1/278 | (2022.01) |
| H02K 7/08 | (2006.01) |
| H02K 9/06 | (2006.01) |

(52) U.S. Cl.
CPC .............. H02K 1/32 (2013.01); H02K 1/278
(2013.01); H02K 7/083 (2013.01); H02K 9/06
(2013.01)

(58) Field of Classification Search
CPC .......... H02K 1/32; H02K 1/325; H02K 1/278;
H02K 1/2753; H02K 1/2706; H02K
1/272; H02K 1/274; H02K 1/2781; H02K
1/2783; H02K 7/08; H02K 7/083; H02K
9/06; H02K 9/04; H02K 9/02
See application file for complete search history.

(56) References Cited

U.S. PATENT DOCUMENTS

| | | | |
|---|---|---|---|
| 9,564,787 B2 * | 2/2017 | Kitamura ............... | H02K 5/207 |
| 2015/0130306 A1 * | 5/2015 | Kitamura ............... | H02K 5/207 |
| | | | 310/63 |
| 2017/0047821 A1 * | 2/2017 | Klassen .................... | H02K 5/16 |
| 2019/0109515 A1 * | 4/2019 | Hopkins ................. | H02K 1/32 |
| 2020/0014259 A1 * | 1/2020 | Yabe ........................ | H02K 1/27 |
| 2025/0064285 A1 * | 2/2025 | Lu ............................ | H02K 9/02 |

* cited by examiner

*Primary Examiner* — Oluseye Iwarere
*Assistant Examiner* — Nicholas Lee Setzer
(74) *Attorney, Agent, or Firm* — Frank Gao, Esq.

(57) ABSTRACT

The patent application discloses a rotor for a motor. The
rotor may comprise a shaft body, a shaft, a rotor magnet, and
a plurality of air holes. The shaft body may have a first end,
a second end, and a cylindrical body between the first end
and the second end. The shaft may extend along a central
axis of the shaft body. The rotor magnet on a magnetic slot
inside the cylindrical body may be configured to rotate
together with the shaft. The plurality of air holes on the first
end of the shaft body may run through the cylindrical body
and end in the second end of the shaft body.

20 Claims, 4 Drawing Sheets

MOTOR ROTOR

TECHNICAL FIELD

The invention relates to the technical field of motors, in particular to a motor rotor.

BACKGROUND

At present, the motor of the air compressor of the automobile air suspension system used by most automobile companies in the automobile market is basically a brush DC motor, which can be electrically connected with a battery by means of a relay, and a very high starting current will be used when starting, which will lead to at least temporary voltage drop of the battery, resulting in voltage instability and fluctuation. And that motor works in a non-optimal running state to cause poor abrasion of a carbon brush, different noise and electromagnetic sparks are generated, and electromagnetic interference is caused on a vehicle-mounted electronic instrument to influence the normal work of the vehicle-mounted electronic instrument. At the same time, the brush DC motor has low working efficiency, large power consumption, short life, high noise and EMC interference, which affects the comfort and satisfaction of customers.

At the same time, in the traditional brushless motor, the rotor is basically made of magnetic steel, which is bonded to the surface of the rotor core through high-strength and high-temperature-resistant structural glue, and is used after being completely cured. And a stainless steel sheath is additionally arranged on the outer surface of the rotor magnetic steel as required, so as to prevent the magnetic steel from being loosening due to centrifugal force or high temperature when the whole machine works for a long time. The rotor manufactured by the conventional process has problems in durability, reliability, vibration, noise and the like in continuous operation in a high-pressure environment, especially when applied to the field of an air compressor of an automobile air suspension system. In particular, the continuous high temperature of the compressor causes heat conduction to the motor, which increases the internal temperature of the motor easily.

Therefore, there is a need to have a better and efficient rotor for a motor.

SUMMARY

In one aspect, one embodiment discloses a rotor for a motor. The rotor may comprise a shaft body, a shaft, a rotor magnet, and a plurality of air holes. The shaft body may have a first end, a second end, and a cylindrical body between the first end and the second end. The shaft may extend along a central axis of the shaft body. The rotor magnet on a magnetic slot inside the cylindrical body may be configured to rotate together with the shaft. The plurality of air holes on the first end of the shaft body may run through the cylindrical body and end in the second end of the shaft body.

Optionally in any aspect, the plurality of air holes are parallel to the central axis of the shaft body.

Optionally in any aspect, the number of magnetic slots are six, nine, or twelve.

Optionally in any aspect, the rotor may further comprise a fan attached to the shaft of the shaft body.

Optionally in any aspect, the fan has a plurality of blades arranged in a circumferential direction.

Optionally in any aspect, the rotor may comprise a plurality of raised ribs attached to the cylindrical body on the first end in a circumferential direction.

Optionally in any aspect, the rotor may comprise a plurality of raised ribs attached to the cylindrical body on the second end in a circumferential direction.

Optionally in any aspect, the rotor may comprise a plurality of raised ribs attached to the cylindrical body on the second end in a circumferential direction.

In further another aspect, one embodiment discloses a rotor for a brushless motor. The rotor may comprise a shaft body and a plurality of air holes. The shaft body may have a first end, a second end, and a cylindrical body between the first end and the second end. The plurality of air holes on the first end of the shaft body may run through the cylindrical body and end in the second end of the shaft body. The plurality of air holes may be parallel to a central axis of the shaft body.

Optionally in any aspect, the rotor further comprises a shaft extending along the central axis.

Optionally in any aspect, the rotor may further comprise a rotor magnet on a magnetic slot inside the cylindrical body configured to rotate together with the shaft.

Optionally in any aspect, the plurality of air holes are arranged around the shaft on the first end and the second end of the shaft body symmetrically.

Optionally in any aspect, the number of magnetic slots are six, nine, twelve, or more.

Optionally in any aspect, the rotor may further comprise a fan attached to the shaft of the shaft body.

Optionally in any aspect, the fan has a plurality of blades arranged in a circumferential direction.

Optionally in any aspect, the rotor may further comprise a plurality of raised ribs attached to the cylindrical body on the first end in a circumferential direction.

Optionally in any aspect, the rotor may further comprise a plurality of raised ribs attached to the cylindrical body on the second end in a circumferential direction.

In yet another aspect, one embodiment discloses a rotor for a brushless motor. The rotor may comprise a bearing portion, a shaft body, a plurality of air holes. The shaft body may have a shaft extending along a central axis, and rotatably supported by the bearing portion. The plurality of air holes inside the shaft body. The plurality of air holes may be parallel to the central axis of the shaft body.

BRIEF DESCRIPTION OF THE DRAWINGS

In order to illustrate the technical solutions more clearly in the embodiments of the present disclosure or the exemplary techniques, the drawings to be used in the embodiments or the description of the exemplary embodiments will be briefly described below. Obviously, the drawings in the following description are only certain embodiments of the present disclosure, and other drawings may be obtained according to the structures shown in the drawings without any creative work for those skilled in the art.

Figure 1:
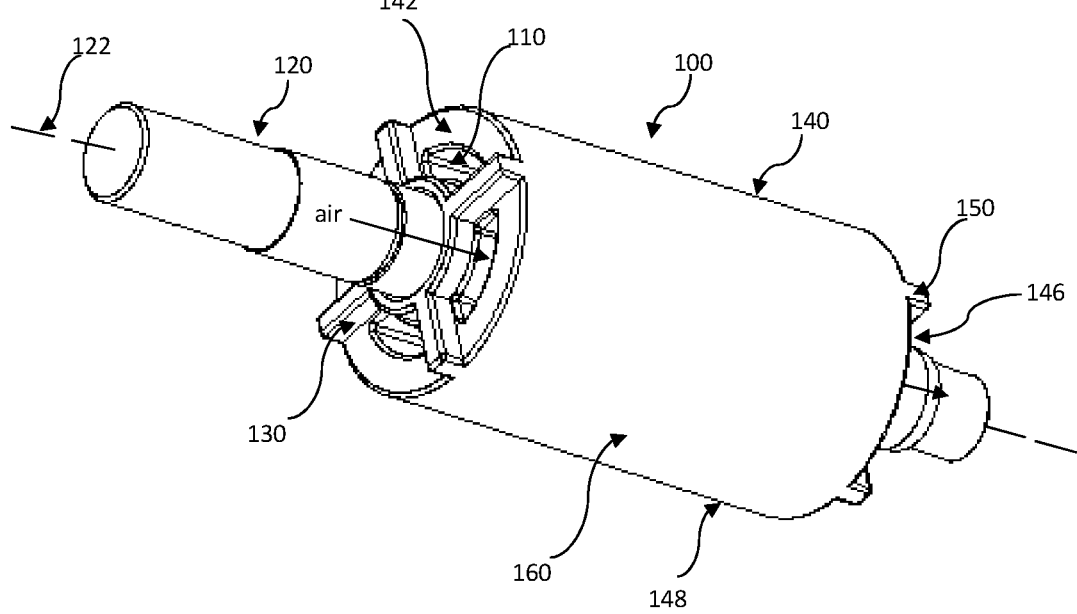
FIG. 1 is a perspective view of a rotor for a motor according to one exemplary embodiment.

The implementation, functional features and advantages of the present disclosure will be further described with reference to the accompanying drawings.

DETAILED EMBODIMENTS

Definitions

The invention is not limited to the particular methodology, protocols, and reagents described herein because they may vary. Further, the terminology used herein is for the purpose of describing particular embodiments only and is not intended to limit the scope of the present invention. As used herein and in the appended claims, the singular forms "a," "an," and "the" include plural reference unless the context clearly dictates otherwise. Unless defined otherwise, all technical and scientific terms and any acronyms used herein have the same meanings as commonly understood by one of ordinary skill in the art in the field of the invention. Although any methods and materials similar or equivalent to those described herein can be used in the practice of the present invention, the preferred methods, devices, and materials are described herein. The technical means, creative features, objectives, and effects of the patent application may be easy to understand, the following embodiments will further illustrate the patent application. However, the following embodiments are only the preferred embodiments of the utility patent application, not all of them. Based on the examples in the implementation manners, other examples obtained by those skilled in the art without creative work shall fall within the protection scope of the present invention. The experimental methods in the following examples are conventional methods unless otherwise specified. The materials used in the following examples can be obtained from commercial sources unless otherwise specified.

The Embodiments

Hereinafter, preferred embodiments of the present invention will be described with reference to the accompanying drawings.

Broadly, the present invention discloses a plurality of air holes being designed and added on the rotor iron core, so that air can pass through the inside of the rotor iron core when the motor, such as brushless motor runs to blow away the heat generated by a pump, thereby having a remarkable effect on reducing the temperature rise of the brushless motor, effectively preventing the demagnetization problem of magnetic steel and simultaneously improving the duty ratio of an air compressor. And secondly, due to that structural design of the air holes, the weight of the rotor iron core is reduced, the moment of inertia is reduced, and the starting performance of the brushless motor is also improved.

Secondly, the magnetic steel and the rotor iron core are combined into a whole through an injection molding process, so as to protect the magnetic steel, to prevent the magnetic steel from being damaged and broken due to collision in the production process, simultaneously prevent the magnetic steel from being loosened due to centrifugal force during operation.

Through the adjustment on the injection molding, it eliminates a need to have balance baffles separately at both ends of the rotor iron core, it saves the manufacturing cost effectively (at least two balance baffles are used for balancing the rotor in the traditional rotor manufacturing). In addition, because a balance rotor is omitted to be arranged on the rotor in a mechanical matching way, the vibration phenomenon of the rotor can be reduced, and the noise problem caused by vibration is reduced. Other technical effects brought by the present invention will be further described in the detailed description.

A rotor 100 according to the present embodiment of the present invention may be, for example, installed in a household electrical appliance, such as an air conditioner, an air purifier, or a refrigerator, and may be used as a driving source of a fan or a pump. Alternatively, the rotor 100 for a motor according to the present embodiment may be used as a driving source of industrial equipment, such as, for example, a sorter, or driving force of an air compressor for an automobile. Note that rotors according to other preferred embodiments of the present invention may be used for other purposes. For example, rotors according to other preferred embodiments of the present invention may be installed in an office automation appliance, a medical appliance, an automobile, and the like, and may be used to generate a variety of driving forces. Hereinafter, a device in which the rotor 100 is installed is referred to as a "drive apparatus".

FIG. 1 is a perspective view of an external appearance of the rotor 100 for a motor according to one of the present embodiment. The rotor 100 may comprise a shaft body 140 having a first end 142, a second end 146, and a cylindrical body 148 between the first end 142 and the second end 146; a shaft 120 may extend along a central axis 122 of the shaft body 140. A plurality of air holes 110 on the first end 142 of the shaft body 140 running through the cylindrical body 148 and end in the second end 146 of the shaft body 140. In one exemplary embodiment, the plurality of air holes 110 may run parallel to the central axis 122 of the shaft body 140. In one embodiment, the plurality of air holes 110 may be arranged around the shaft 120 on the first end 142 of the shaft body 140 symmetrically. In another embodiment, the plurality of air holes 110 may be arranged around the shaft 120 on the second end 146 of the shaft body 140 symmetrically. As shown in FIG. 1, there are four air holes distributed around the shaft 120 in a circumferential direction. The number of the air holes can be more or less, can be small or large around the shaft 120. The number of the air holes may be 2, 4, 6, 8, 10, or more, for example.

In one embodiment, the rotor 100 may comprise a plurality of raised ribs 130 attached to a shell structure 160 of the cylindrical body 148 on the first end 142 in a circumferential direction. In one embodiment, the rotor 100 may comprise a plurality of raised ribs 150 attached to the shell structure 160 of the cylindrical body 148 on the second end 146 in a circumferential direction. The raised ribs 150 are positioned on both sides of the air holes 110. The raised ribs 150 may be capable of stirring the air flow. The raised ribs 150 may be formed near the air holes by the injection-molding, and the raised ribs 150 may be similar to an axial flow fan blade and plays a role in stirring the air flow, so that the heat generated during the operation of the brushless motor is transmitted out through the air holes 110 in time, and the temperature is not too high due to heat accumulation.

In one embodiment, the injection molding material is Polyphenylene Sulfide (PPS), which has high crystallinity, hard and brittle, has excellent thermal stability, and can exhibit the characteristics of high resistance of thermosetting plastics. Preferably, the Polyphenylene Sulfide for injection molding is modified PPS. The injection molding process and the performance of the shell 160 after an injection molding are further improved by the selection of the injection molding material.

Figure 2:
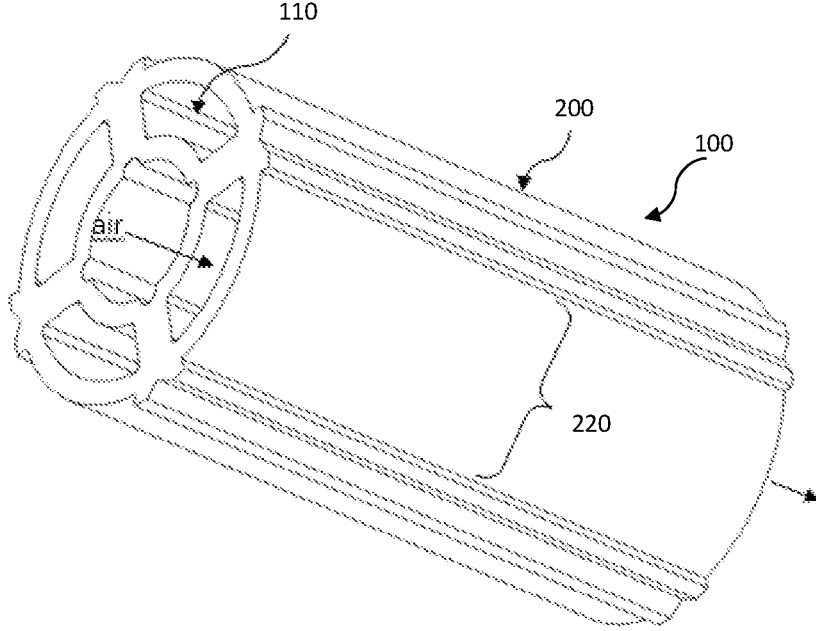
FIG. 2 is a perspective view of a rotor core structure according to one exemplary embodiment.

As shown in FIG. 2, the rotor 100 includes a rotor core 200. The rotor core 200 may include a magnetic slot 220 inside the cylindrical body 148 (shown in FIG. 1).

Figure 3:
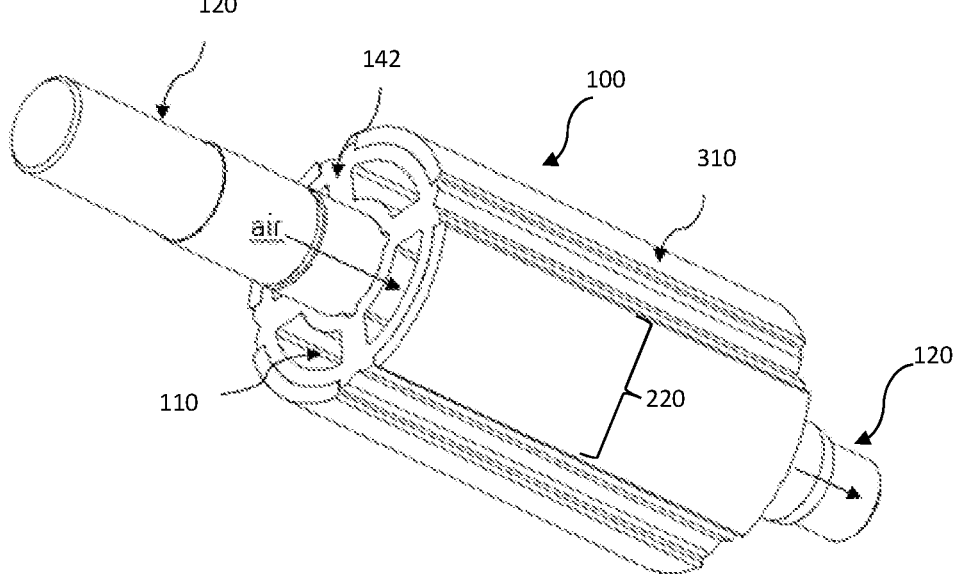
FIG. 3 is a perspective view of an assembly structure of a rotor core, a rotating shaft and a magnetic steel according to an embodiment of the present invention.

As shown in FIG. 3, the rotor 100 may further include a rotor magnet 310, such as magnetic steel, for example, on a magnetic slot 220 configured to rotate together with the shaft 120.

In this embodiment, the shaft 120 is treated with a thermal barrier coating. In actual work, the shaft 120 is matched with an eccentric wheel (not shown in the figure) with a certain eccentric distance. During operation, the temperature of the air compressor will be very high, and the surface of the cylinder cover may reach 150 degrees C. or even 180 degrees C. Therefore, the heat inside the air compressor can be conducted to the brushless motor structure through the combination of the eccentric wheel and the shaft 120, so that the temperature inside the brushless motor is increased, and even the rotor magnet 310, such as magnetic steel of the rotor 100 is possibly demagnetized; and in order to avoid the phenomenon, the output shaft end of the shaft 120 is subjected to thermal barrier coating process treatment. The heat of the air compressor is reduced to be conducted to the brushless motor through the combination of the eccentric wheel and the shaft 120, the temperature rise of the brushless motor is reduced (the temperature reduction effect is 10%-15%), and the demagnetization failure caused by the long-term high temperature state of the magnetic steel is avoided to a certain extent; and meanwhile, the temperature resistance level of the rotor magnet 310 can be reduced to save the cost of the rotor magnet 310.

In this embodiment, the magnetic slots 220 may include at least one of the following: six slots with four levels, nine slots with six levels, and twelve slots with eight levels.

In this embodiment, the rotor may be an inner rotor structure.

In this embodiment, the rotor core 200 may be laminated with silicon steel sheets. Through riveting, or laser welding, or resin bonding and other processes, the lamination coefficient is greater than 0.97; the original unbalanced may be less than 150 mg. The silicon steel sheet is made of 50W 470, 35W 300 and 35W 310, and the surface is subject to anti-rust treatment to avoid rusting, which reduces the iron loss during operation to a certain extent.

In this embodiment, the rotor magnet 310, such as magnetic steel, is made of strong magnetic Nd—Fe—B material. Belong to (residual magnetism, coercive force and magnetic energy product) three-high magnetic steel, that temperature resistance grade of the magnetic steel can be selected from SH, UH or even high, the magnetizing mode of the magnetic steel can be radial magnetizing, parallel magnetizing or other magnetize processes (Halbach magnetizing) according to actual needs, and the surface of the magnet steel is subjected to antirust treatment, such as zinc plating, nickel plating and the like. Ensure that there is no rust after the salt spray test at the client.

In this embodiment, the shaft 120 is made of medium carbon steel (40Cr, 45, etc.), and is subjected to quenching and tempering treatment to achieve preferable hardness and toughness compatibility; especially, the output shaft of the rotating shaft 120 at the part connected with the air compressor has a diameter of from about 10 mm to about 12 mm, is subjected to local high-frequency quenching treatment, and has a hardness of HRC50-60. The bending fatigue strength of the rotating shaft is improved, and the risk of bending and even breaking of the rotating shaft is reduced to a certain extent.

Figure 4:
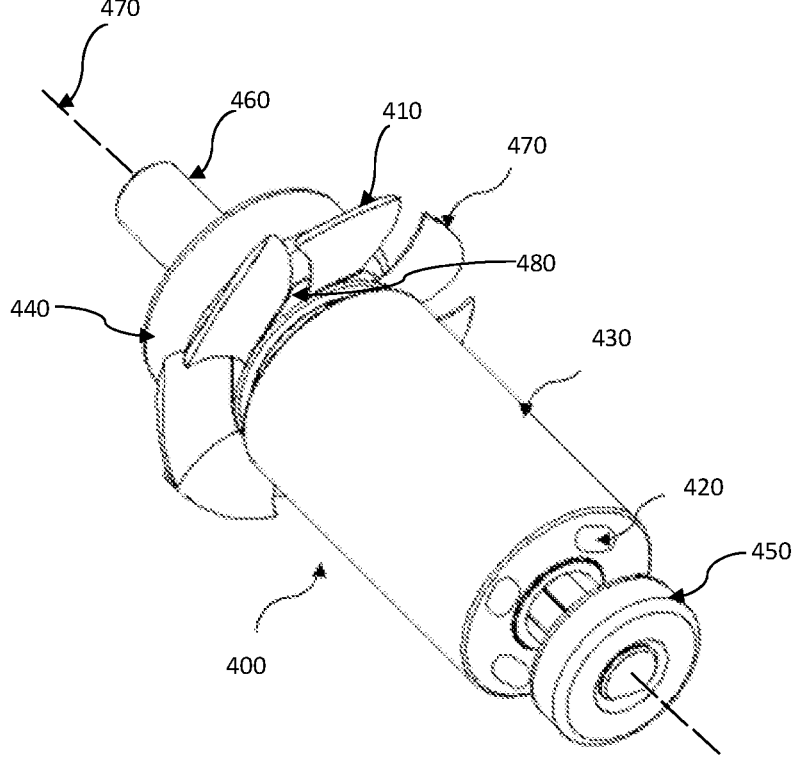
FIG. 4 is a perspective view of a rotor for a motor according to another exemplary embodiment.

Referring first to FIG. 4, in another embodiment, the rotor 400 may further comprise a bearing portion 440 and 450, a shaft body 430, and a plurality of air holes 420. The shaft body 430 may have a shaft 460 extending along a central axis 470, and rotatably supported by the bearing portion 440, 450. A plurality of air holes 420 are inside the shaft body 430. The plurality of air holes 420 are parallel to the central axis 470 of the shaft body 430.

The rotor 400 may further include a fan 410. The fan 410 may have a plurality of blades 470 arranged in a circumferential direction.

The fan 410 may be preferably fixed to the shaft 460 by an interference fit, for example, between the bearing portion 440 and the shaft body 430. The shaft body 430 preferably includes cylindrical portion through holes 420 arranged to radially overlap with the blades 470. Each blade 470 is preferably a pitched blade including an upper edge and a lower edge arranged at different circumferential positions.

Once the rotor 400 is caused to rotate in one direction, the fan 410 rotates to cause air to be suctioned in through each of the air holes 420. While the fan 410 continues to rotate, atmospheric pressure inside the rotor 400 gradually increases, making it less easy for a wind to flow into the rotor 400. Thereafter, the air flows backward and is discharged out of the rotor 400 through each air hole 420. This action establishes a channel through which the air suctioned in through any air holes 420 flows to each cylindrical portion through hole. As a result, a negative pressure is produced in the vicinity of this channel, and the air inside the rotor 400 is caused to flow out of the rotor 400 through each air hole 420. Then, the atmospheric pressure inside the rotor 400 decreases, and a wind is caused to flow into the rotor 400. This cycle is repeated at short time intervals, reducing the probability of a phenomenon of the air stagnating because of the atmospheric pressure inside the rotor 400. In addition, the fan 410 is arranged to press the air inward inside the rotor 400 with great strength over an entire radial extent of each blade 470, making it possible to discharge the air flowing backward radially outward through a centrifugal force. Further, since a windage loss that occurs during the rotation is small, efficiency of the rotor 400 is improved by cooling.

Furthermore, interference between air holes 420 and the blades 470 is so limited that an occurrence of a loud noise is significantly reduced or prevented. (In the case of a centrifugal fan, when only a small amount of air is suctioned in through each cover portion through air hole 420, a force which presses a wind into the rotor 400 is weak.)

The air holes 420 according to the present preferred embodiment are preferably provided as a plurality of holes arranged in the circumferential direction. This arrangement promotes a flow of the air. Moreover, each air hole 420 preferably includes rounded edges. This arrangement contributes to reducing or preventing a noise caused by interference between the air hole 420 and the blades 470.

Each of the air holes 420 according to the present preferred embodiment preferably is a hole whose longitudinal direction is parallel or substantially parallel to the circumferential direction. This arrangement allows each through hole to be defined along a flow of the wind, increasing efficiency with which the air is suctioned in and is discharged.

The fan 410 according to the present preferred embodiment includes a cylindrical blade support portion 480 arranged to support the blades 470. The blades 470 are arranged to project radially outward from the blade support portion 480. This arrangement preferably contributes to preventing hindrance to an axial flow of a wind caused by rotation of the fan 410.

In the present preferred embodiment, moreover, a radially outer end edge of each air hole 420 is arranged radially inward of an outer edge of each blade 470. Adoption of this arrangement makes it easier for a negative pressure to be produced in the vicinity of each air hole 420, making it possible to maintain efficiency with which the air is suctioned in at a high axial level.

While preferred embodiments of the present invention have been described above, it will be understood that the present invention is not limited to the above-described preferred embodiments.

While the motor having the rotor 100 for according to the above-described preferred embodiment preferably is a three-phase brushless motor, for example, this is not essential to the present invention. Motors according to other preferred embodiments of the present invention may be single-phase or two-phase brushless motors, brushed motors including brushes and commutators, or other types of motors, such as, for example, stepping motors.

It will be appreciated by persons skilled in the art that numerous variations and/or modifications may be made to the invention as shown in the specific embodiments without departing from the scope of the invention as broadly described. The present embodiments are, therefore, to be considered in all respects as illustrative and not restrictive.

The above shows and describes the basic principles, main features and advantages of the patent application. Those skilled in the industry should understand that the present patent application is not limited by the above-mentioned embodiments. The above-mentioned embodiments and the description are only preferred examples of the present patent application and are not intended to limit the present patent application, without departing from the present utility patent application. Under the premise of spirit and scope, the present utility patent application will have various changes and improvements, and these changes and improvements fall within the scope of the claimed utility patent application. The scope of protection claimed by the utility patent application is defined by the appended claims and their equivalents.

We claim:

1. A rotor for a motor, comprising:
a shaft body having a first end, a second end, and a cylindrical body between the first end and the second end;
a shaft extending along a central axis of the shaft body;
a rotor magnet on a magnetic slot inside the cylindrical body configured to rotate together with the shaft;
a plurality of raised ribs with each rib connecting to the shaft at one end, radially extending out to an outer cylindrical surface of the cylindrical body at the other end, wherein the plurality of raised ribs divide the outer cylindrical surface into a plurality of areas; and
a plurality of air holes on the first end of the shaft body running through the cylindrical body and end in the second end of the shaft body, wherein the plurality of air holes have each opening on each of the plurality of areas of the outer cylindrical surface between the plurality of raised ribs, wherein the plurality of air holes are fan-like shapes, wherein the fan-like shape of each of the plurality of air holes is defined by two adjacent raised ribs as lateral boundaries, such that each air hole widens from a narrower portion adjacent to the shaft to a wider portion at the outer cylindrical surface in correspondence with the diverging spacing between adjacent radially-extending ribs.

2. The rotor of claim 1, wherein the plurality of air holes run parallel to the central axis of the shaft body.

3. The rotor of claim 1, wherein the plurality of air holes are arranged around the shaft on the first end and the second end of the shaft body symmetrically.

4. The rotor of claim 1, wherein the number of magnetic slots are six, nine, or twelve.

5. The rotor of claim 1, further comprising a fan attached to the shaft of the shaft body.

6. The rotor of claim 5, wherein the fan has a plurality of blades arranged in a circumferential direction.

7. The rotor of claim 1 further comprising the plurality of raised ribs attached to the cylindrical body on the first end in a circumferential direction.

8. The rotor of claim 1 further comprising the plurality of raised ribs attached to the cylindrical body on the second end in a circumferential direction.

9. A rotor for a motor, comprising:
a shaft body having a first end, a second end, and a cylindrical body between the first end and the second end; a plurality of raised ribs with each rib connected to the shaft at one end, radially extending out to an outer cylindrical surface of the cylindrical body at the other end, wherein the plurality of raised ribs divide the outer cylindrical surface into a plurality of areas; and
a plurality of air holes on the first end of the shaft body running through the cylindrical body and end in the second end of the shaft body, wherein the plurality of air holes are parallel to a central axis of the shaft body, wherein the plurality of air holes have each opening on each of the plurality of areas of the outer cylindrical surface between the plurality of raised ribs, wherein the plurality of air holes are fan-like shapes, wherein each of the plurality of fan-like shaped air holes is laterally bounded by two adjacent radially-extending raised ribs, the fan-like shape of each air hole corresponding to the sector-shaped space defined between two adjacent radially-extending ribs on the outer cylindrical surface of the cylindrical body.

10. The rotor of claim 9, further comprising a shaft extending along the central axis.

11. The rotor of claim 10, further comprising a rotor magnet on a magnetic slot inside the cylindrical body configured to rotate together with the shaft.

12. The rotor of claim 10, wherein the plurality of air holes are arranged around the shaft on the first end and the second end of the shaft body symmetrically.

13. The rotor of claim 12, wherein the number of magnetic slots are six, nine, or twelve.

14. The rotor of claim 10, further comprising a fan attached to the shaft of the shaft body.

15. The rotor of claim 14, wherein the fan has a plurality of blades arranged in a circumferential direction.

16. The rotor of claim 9 further comprising the plurality of raised ribs attached to the cylindrical body on the first end in a circumferential direction.

17. The rotor of claim 9 further comprising the plurality of raised ribs attached to the cylindrical body on the second end in a circumferential direction.

18. A rotor of a motor, comprising:
a bearing portion;
a shaft body having a shaft extending along a central axis, and rotatably supported by the bearing portion; a plurality of raised ribs with each rib connected to the shaft at one end, radially extending out to an outer cylindrical surface of the cylindrical body at the other end, wherein the plurality of raised ribs divide the outer cylindrical surface into a plurality of areas; and a plurality of air holes inside the shaft body, wherein the plurality of air holes are parallel to the central axis of the shaft body, wherein the plurality of air holes have each opening on each of the plurality of areas of the outer cylindrical surface between the plurality of raised ribs, wherein the plurality of air holes are fan-like shapes, wherein each of the plurality of fan-like shaped air holes corresponds to a sector-shaped space between two adjacent radially-extending ribs, each sector-shaped space being wider at the outer cylindrical surface than at the shaft, and wherein adjacent fan-like shaped air holes are separated from each other by the radially-extending raised ribs.

19. The rotor of claim 18 further comprising a fan attached to the shaft of the shaft body.

20. The rotor of claim 19 wherein the fan includes a plurality of blades arranged in a circumferential direction.

* * * * *